United States Patent [19]

Garbe et al.

[11] 4,266,996
[45] May 12, 1981

[54] METHOD AND TOOL FOR PRODUCING CENTERED PARTS HAVING SPHERICAL SURFACES

[75] Inventors: Reinhold F. Garbe, Mountain View; Leo A. Esterl, Sunnyvale; Ronald E. Koltun, Colfax, all of Calif.

[73] Assignee: Spectra-Physics, Inc., Mountain View, Calif.

[21] Appl. No.: 115,204

[22] Filed: Jan. 25, 1980

[51] Int. Cl.³ .................. B32B 31/16; B24B 1/00; B29D 11/00
[52] U.S. Cl. .................. 156/154; 51/216 LP; 51/284 R; 65/61; 156/253; 156/293; 264/1.1; 350/417
[58] Field of Search .............. 51/216 LP, 284 R; 65/61; 156/154, 293, 253; 264/1; 350/178

[56] References Cited
U.S. PATENT DOCUMENTS

| | | | |
|---|---|---|---|
| 2,362,501 | 11/1944 | Salabes | 51/284 X |
| 2,424,835 | 7/1947 | Luckey et al. | 51/284 X |
| 2,434,614 | 1/1948 | Hicks | 156/154 X |
| 3,140,568 | 7/1964 | Beasley | 51/216 LP |
| 3,514,908 | 6/1970 | Herbert et al. | 51/284 |
| 3,857,205 | 12/1974 | Van Hove | 51/284 X |
| 3,865,178 | 2/1975 | Legendre | 51/216 LP X |
| 3,996,701 | 12/1976 | Ramirez et al. | 51/216 LP |

Primary Examiner—John T. Goolkasian
Assistant Examiner—Robert A. Dawson
Attorney, Agent, or Firm—Donald C. Feix

[57] ABSTRACT

Parts having centered spherical surfaces are produced by a method and by a tool which seats an inner spherical end of each part on a very accurately generated spherical surface of the tool while a spherical surface is ground and polished on an outer end of each part. The ground and polished surface is formed concentric with the underlying precisely formed spherical surface of the tool or block. The seating of a part against the spherical surface eliminates problems of tilting of the optical axis of the part.

A shell is attached to the spherical surface of the block, and a plurality of openings are drilled through the shell. The sidewalls of the parts are located and supported by the side surfaces of these openings so that the shell holds the parts against any lateral movement during the grinding and polishing operation. As a result the parts can be vigorously ground and polished while being held firmly in a fixed position. A single tool has a large number of openings in the shell.

Large volumes of parts are produced with centered surfaces of superior accuracy at low cost.

14 Claims, 6 Drawing Figures

METHOD AND TOOL FOR PRODUCING CENTERED PARTS HAVING SPHERICAL SURFACES

BACKGROUND OF THE INVENTION

The present invention relates to a method and a tool for producing centered parts having spherical surfaces.

The present invention has particular application to a method and a tool for producing optional parts.

In certain applications it is important to have curved surfaces of optical parts accurately formed and aligned without the use of a costly centering operation.

Spherical surfaces for optical parts have been produced in the prior art by methods and tools which included a block for supporting the parts during the grinding operation.

In the prior art two techniques have been used for supporting the parts on the block.

In one technique, spot blocking, holes were bored into the block through its spherical surface. In this technique all holes must be bored so the bottom of the holes are tangent to the same sphere, and the angular alignment of the bored hole with respect to the center of curvature of the spherical surface can be critical. Since the inner ends of the parts are supported on the milled surface at the bottom of the bore, any variations of the milled surface from true tangency resulted in a lack of centration of the spherical surface ground on the related part. Any internal chamfer between the sidewall of the hole and the milled surface could cause cocking of the part; and any play between the sidewall of the hole and the part could permit a lateral shift which could defeat concentricity of the outer surface of the part. Supporting the ends of the parts on the surfaces of milled holes thus required all the holes to be drilled with great accuracy to the same depth, at the proper angular alignment with respect to the center of curvature of the spherical surface on the block, without internal chamfers between the milled surface and sidewalls, and without slack between the sidewalls and the parts in order for all the spherical surfaces ground on the parts to have centered spherical surfaces. In practice it was difficult to approach an accuracy of fifteen minutes of arc with this prior art technique, and the accuracy actually obtained has typically been in the order of thirty minutes of arc.

In another prior art, flood blocking, technique the parts were attached to the spherical surface of the block by wax or by another substance, rather than being positioned in holes drilled through the spherical surface of the block. This technique did not always provide the desired degree of lateral restraint to permit the parts to be ground and polished vigorously at high rates of production. This technique also presented problems of shrinkage of the wax or other substance as the wax or other substance cooled; and this could cause misalignment of the parts. Also, since the flood blocking technique used a lay-in tool to position the parts on the block, any error on the unfinished end of the part could be transferred to the finished end of the part.

SUMMARY OF THE PRESENT INVENTION

It is a primary object of the present invention to produce parts having centered surfaces by a method and a tool which avoid the problems of the prior art.

It is a specific object to insure that the two end surfaces of each part have the proper orientation capable of producing a well centered part.

Another object is to manufacture a tool which can produce a large volume of parts with centered spherical surfaces of superior accuracy at lower cost than the prior art.

In the present invention a very accurate spherical surface is generated on a block.

A complementary shell is then attached to the spherical surface of the block.

A large number of openings are drilled through the shell to expose spherical shaped seating surfaces on the block. The drilling of the holes through the shell is done in two steps. First the holes are drilled to a depth at which the sidewalls of the holes end just short of the spherical surface of the block. The shell is then removed from the block and the boring of each hole is completed by counterboring through from the back side of the shell. This prevents any contact of the bit with the spherical surface of the block at the inner periphery of the holes.

The shell is re-attached to the block, and each hole is filled with an adhesive, such as wax or pitch.

A part is pushed into each hole until the inner end of the part seats on the spherical surface of the block. The sides of the part are located and supported by the sidewalls of the hole and the adhesive between the sides of the part and the sidewalls of the hole.

A spherical surface is then generated on the outer end of each part.

In a specific embodiment of the invention, used when the curvature of the inner end of the part is weaker than the curvature of the spherical surface of the block, a clearance hole is bored through the shell and into the block prior to drilling the cylindrical bores in the shell as noted above. The hole in the block is of smaller diameter and is aligned with a related opening in the shell. The clearance hole insures that the inner end of the part seats on the spherical surface of the tool at the periphery of the hole.

The parts are then ground to the same thickness to establish concentricity with the underlying spherical surface of the block. Parts with a radius of two hundred millimeters or more on generated surfaces produced in accordance with the present invention have a nominal accuracy of about two to five minutes of arc.

Methods and tools which incorporate the techniques and structures described above and which are effective to function as described above constitute specific objects of this invention.

Other and further objects of the present invention will be apparent from the following description and claims and are illustrated in accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made if desired by those skilled in the art without departing from the present invention and the purview of the appended claims.

BRIEF DESCRIPTION OF THE DRAWINGS

FIG. 3 also shows a part in place in an opening in the shell.

DESCRIPTION OF THE PREFERRED EMBODIMENTS

Figure 1:
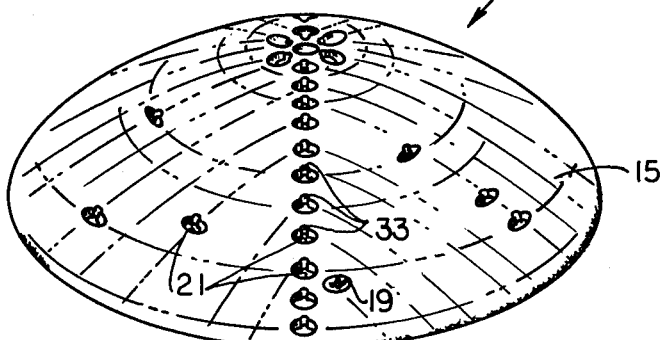
FIG. 1 is an isometric view of a tool constructed in accordance with one embodiment of the present invention.

A tool constructed in accordance with one embodiment of the present invention is indicated generally by reference number 11 in FIG. 1.

Figure 2:
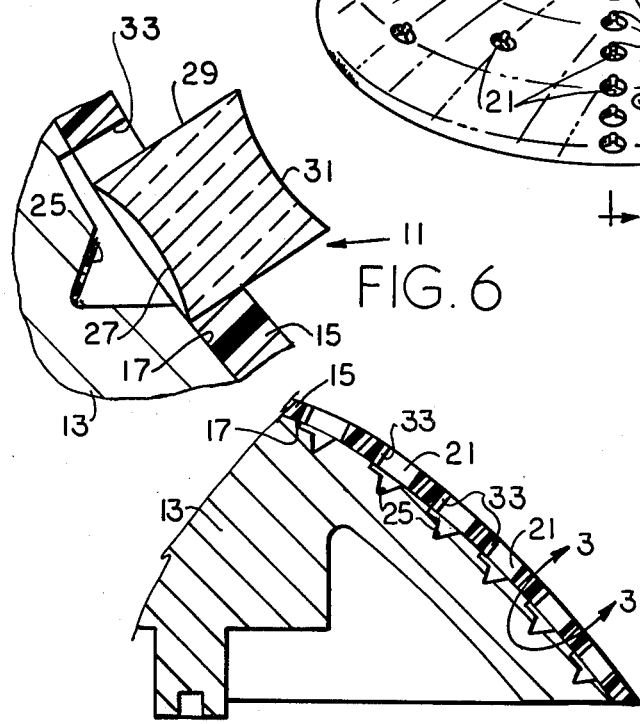
FIG. 2 is a fragmentary view in cross section taken along the line and in the direction indicated by the arrows 2—2 in FIG. 1.
Figure 4:
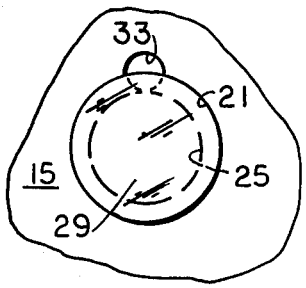
FIG. 4 is a fragmentary plan view taken along the line and in the direction indicated by the arrows 4—4 in FIG. 3.

The tool comprises a block 13 and a complementary shell 15 shown in FIG. 2.

The block 13 is a metal block and has a spherical surface 17. The spherical surface 17 is generated very accurately. In one embodiment of the invention a single point tool on a lathe or a mill is used to produce the spherical surface 17. The spherical surface is precision ground to high accuracy. This accurately determines the radius, minimizes the surface roughness and insures sphericity.

The shell 15 is formed complementary to the spherical surface 17. In a specific embodiment the shell 15 is spun on the surface 17.

The shell 15 is attached to the block 13 by a number of countersunk screws 19.

A number of holes 21 are drilled through the shell 15 to expose spherical seating surfaces 23 on the block at the bottom of the holes 21. Note that surface 23 is part of spherical surface 17.

The drilling of the holes 21 through the shell is done in two steps. First the holes 21 are drilled to a depth at which the sidewalls of the holes end just short of the spherical surfaces of the block. The shell is then removed from the block and the boring of each hole 21 is completed by counterboring from the backside of the shell. This prevents any contact of the drill bit with the spherical surface 17 of the block at the inner periphery at the holes 21.

The shell 15 is then re-attached to the block.

In a preferred embodiment of the invention a relief opening 33 is drilled in the shell in a sidewall of each hole 21.

After the shell has been re-attached to the block, each hole 21 is filled with an adhesive substance (such as wax or pitch) which is easily removable.

A part 29 is then pushed into each hole until the inner end of the part seats on the spherical surface 23 at the bottom of the hole 21. Pushing the part 29 into the hole 21 forces the adhesive up and around the sides of the part 29 to fill any space between the inside of the opening 21 and the outer side surface of the part 29. The adhesive then acts with the sidewalls to locate and support the sides of the part 29 so that the spherical surface 31 can be ground and polished vigorously with the part in place and without any lateral shifting or tilting of the part 29 from the desired alignment with the block 13.

The relief opening 33 permits excess adhesive and trapped gas to be easily pushed out of the hole 21 and clearance hole 25.

With the parts 29 seated on the spherical surface 23 and held firmly against any lateral movement, a spherical surface 31 is then ground on the outer end of each part 29.

Because the part 29 seats on a spherical surface 23, if a spherical surface 31 is ground to be concentric with the spherical surface 17 of the block 13, then the part is well centered.

In specific embodiments of the invention the part 29 may be an optical part cut from a glass rod, a press blank, or a generated right circular cylinder.

In one embodiment of the invention a dummy part 29 is placed in at least one of the holes 21, and all of the parts 29 are ground to the same thickness as the thickness of the dummy part.

In another embodiment the thickness of the parts is checked with an ultrasonic gauge.

After the spherical surfaces 31 have been ground on the parts 29, the surfaces 31 are polished with the part 29 in place in the hole 21.

After grinding and polishing the parts 29 are removed from the tool 11.

The tool of the present invention enables a large number of parts to be produced at low cost and with second surfaces (spherical surfaces 31) which are well centered with respect to first surfaces (surfaces 27) of the parts.

When the parts 29 are optical parts, the inner end of each part 29 will have been formed with an accurately generated first surface 27 prior to placing the part in the tool 11.

The present invention enables the second surface 31 to be ground and polished on the outer end of the part 29 so as to be centered with respect to the first surface 27.

If the mechanical axis of the part 29 is normal to the first surface 27 at the point of intersection of the mechanical axis and the first surface 27, then the tool of the present invention produces a well centered part over the whole diameter of the part.

When the first surface 27 is not generated such that the mechanical axis of the part is normal to the first surface 27 at the point of intersection of the two, the present invention still produces a second surface that is centered with respect to the first surface. In this case the second surface 31 is centered with respect to the first surface 27 but not over the entire diameter of the part 29. The entire diameter of the part 29 therefore cannot be used as the aperture. Instead, the useful aperture is reduced to some central portion of the part 29, and the extent of the useful aperture is dependent upon how far off normal the mechanical axis of the part 29 intersects the first surface 27.

The tool of the present invention produces centered parts when at least three points of the inner end of the part 29 contact the spherical seating surface 23.

Figure 3:
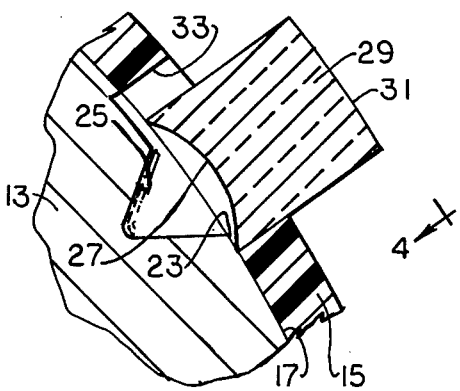
FIG. 3 is a fragmentary enlarged view of the portion of FIG. 2 shown encircled by the arrows 3—3.

In the embodiment of the invention illustrated in FIG. 3 the first surface 27 has a stronger curvature than the curvature of the spherical surface 17 of the block 13.

With the spherical curvature of the first surface 27 illustrated in FIG. 3 the lateral position of the part 29 within the hole 21 is not critical. The lower edge of the first spherical surface 27 rests on the spherical surface 17 so that there is, in effect, an intersection of these two spheres. This intersection of two spheres will automatically center the spheres relative to each other regardless of the lateral position of one sphere with respect to the other. As described above, grinding and polishing the second surface 31 concentric to the spherical surface 17 produces a centering of the surface 31 with respect to the surface 27.

Figure 5:
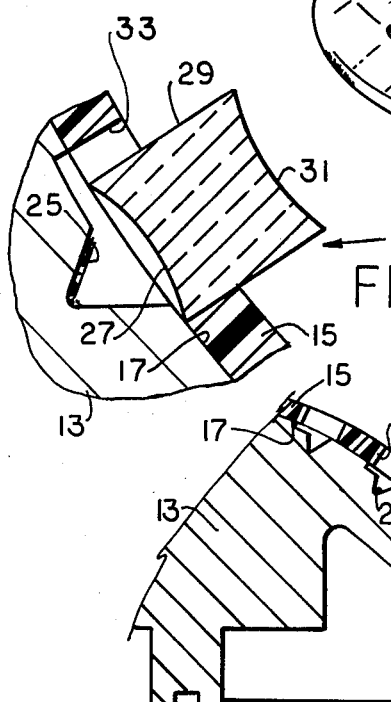
FIG. 5 is a schematic view illustrating principles involved in obtaining centering of two curved surfaces on an optical part.

The present invention is also applicable to parts 29 in which the first surface 27 has a curvature which is weaker than that of the spherical surface 17. For example, and as illustrated in FIG. 5, the present invention is used to generate a second surface 31 on a part 29 which has a first surface 27 that is planar or even convex, as viewed from the inner end of the part 29. In this case the block 13 is formed with a clearance hole 25 aligned with each related hole 21 and extending through the spherical surface 17. The maximum diameter of the clearance hole 25 is less than the diameter of the hole 21 so that there is some lateral overlap of the part 29 about the entire periphery of the upper end of the clearance hole 25. This insures that, in the case of a part 29 having a first surface 27 formed with a weaker curvature than the curvature of spherical surface 17, the first surface 27 must seat on the spherical surface 17 on at least three points about the upper periphery of the clearance hole 25.

In a preferred embodiment of the present invention the clearance hole is drilled through the shell 15 and into the block 13 prior to drilling the hole 21 in the shell.

FIG. 5 illustrates how the tool 11 of the present invention produces a well centered second surface 31 when the first surface 27 has a curvature weaker than the curvature of the spherical surface 17 on the block 13. In FIG. 5 the line 41 is a line drawn across the upper periphery of the clearance hole 25 and through the first surface 27 at the points where the first surface 27 seats on the spherical surface 17. The segment 43 of the line 41 between the points engaged with the spherical surface 17 is a chord of the spherical surface 17.

The line 45 bisects the chord 41 and is normal to the first surface 27 at the point of intersection of the line 45 and the first surface 27.

By grinding and polishing the second surface 31 concentric to the spherical surface 17 of the block, the second surface 31 is generated normal to the line 45 at the point where the line 45 intersects the surface 31. This line 45 defines the optical axis of the part 29. Thus, by generating the first surface 27 on the part 29 prior to putting the part on the block, by seating the first surface 27 on the spherical surface 17 of the block, by maintaining the part 29 in a predetermined vertical alignment with the block 13, and by supporting the part against lateral movement during grinding and polishing of the second surface 31; the desired centered relationship between the second surface 31 and the first surface 27 is obtained.

While the embodiments of the invention described above have a convex spherical surface 17 for generating convex surfaces 31 on the parts 29, the present invention is also applicable to a tool 11 having a concave spherical surface for generating concave surfaces on the parts.

Figure 6:
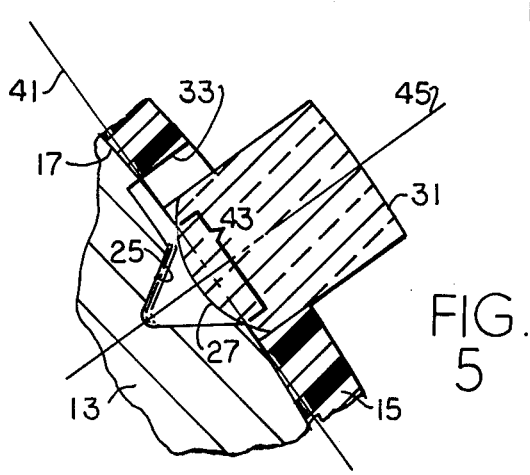
FIG. 6 is a view like FIG. 3 but showing an embodiment of the invention in which the tool has a concave spherical surface instead of the convex spherical surface shown in the FIG. 3 embodiment.

FIG. 6 is a view (like FIG. 3) showing an embodiment of the invention in which the spherical surface 17 on the block 13 is a concave surface and the spherical surface 31 generated on the part 29 is a concave spherical surface. The elements in the FIG. 6 embodiment which correspond to like elements in the FIG. 3 embodiment are indicated by like reference numerals.

While we have illustrated and described the preferred embodiments of our invention, it is to be understood that these are capable of variation and modification; and we therefore do not wish to be limited to the precise details set forth, but desire to avail ourselves of such changes and alterations as fall within the purview of the following claims.

We claim:
1. A method of producing parts having centered spherical surfaces, said method comprising,
   generating a very accurate spherical surface on a block,
   attaching a shell to said surface on the block,
   drilling an opening through the shell to expose a spherical shaped seating surface on the block,
   putting an adhesive into the opening,
   placing a part in the opening with an inner end of the part engaged with the spherical shaped seating surface on the block and with the sides of the part located and supported by the sidewall surfaces of the opening and said adhesive, and
   grinding a spherical surface on the outer end of the part concentric with the underlying precisely formed spherical surface of the block.
2. The invention defined in claim 1 including polishing the ground spherical surface on the outer end of the part with the part in place in said opening.
3. The invention defined in claim 1 wherein a plurality of openings are drilled in the shell for a plurality of parts.
4. The invention defined in claim 3 including drilling a relief hole in the shell and block at each opening.
5. The invention defined in claim 1 wherein the inner surface of the part has a stronger radius of curvature than that of the spherical surface of the block and wherein each spherical shaped seating surface is a continuous spherical surface on the block.
6. The invention defined in claim 1 wherein the inner surface of the part has a weaker curvature than that of the spherical surface on the block and including drilling clearance holes in the block with each clearnace hole of smaller diameter and concentric with a related opening in the shell to cause the inner surface of the part to seat on the spherical surface of the tool at the periphery of the hole.
7. The invention defined in claim 1 including drilling the opening part way through the shell with the shell attached to the block, removing the shell from the block, and then completing the drilling of the opening by counterboring through the shell from the back side of the shell.
8. A tool for holding a part during the grinding on the part or the grinding and polishing on the part of a spherical surface having a center of curvature which defines an optical axis of the part that lies in close coincidence with the mechanical axis of the part, said tool comprising,
   spherical support means for supporting the part against longitudinal movement of the part during grinding and polishing of the spherical surface,
   lateral support means for supporting the part against lateral movement of the part during grinding and polishing of the spherical surface,
   said spherical support means comprising a block having an outer, accurately generated spherical surface engagable with a surface of the part on an end of the part which is opposite the surface to be ground and polished, said lateral support means comprising a shell attached to the spherical support means and having a generally cylindrically shaped opening extending radially through the shell and providing sidewall means for locating and supporting the sides of the part, and wherein the opening in the shell exposes a spherical seating surface for the inner end of the part and which enables the outer end of the part to be ground to a curvature concentric with the underlying precisely formed spherical surface of the block.

9. The invention defined in claim 8 wherein the tool is constructed to produce a plurality of parts having centered spherical surfaces and wherein the shell has a plurality of openings for holding a plurality of parts.

10. The invention defined in claim 9 including an adhesive substance, such as wax or pitch, which coacts with the sidewalls of the cylindrical openings to locate and support the sides of the parts.

11. The invention defined in claim 8 including a relief hole extending through the shell and into the block in a side of each cylindrical shaped opening for preventing trapped adhesive or hot gases under the part to insure seating of the part on spherical surfaces.

12. The invention defined in claim 7 including clearance holes in the block with each hole concentric with and of smaller diameter than a related opening in the shell to insure that the surface on the inner end of a part seats on the spherical surface of the tool at the periphery of the hole.

13. The invention defined in claim 1 wherein the spherical surface of the block is convex.

14. The invention defined in claim 1 wherein the spherical surface of the block is concave.

* * * * *